(12) United States Patent
Hernandez Ladera et al.

(10) Patent No.: US 10,648,558 B2
(45) Date of Patent: May 12, 2020

(54) HYDROSTATIC PROPULSION DRIVE FOR A VEHICLE

(71) Applicant: Robert Bosch GmbH, Stuttgart (DE)

(72) Inventors: Paul Luis Hernandez Ladera, Elchingen (DE); Steffen Mutschler, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 15/864,310

(22) Filed: Jan. 8, 2018

(65) Prior Publication Data

US 2018/0195605 A1 Jul. 12, 2018

(30) Foreign Application Priority Data

Jan. 10, 2017 (DE) ........................ 10 2017 200 241

(51) Int. Cl.
*F16H 61/4008* (2010.01)
*F16H 61/423* (2010.01)
*F16H 61/433* (2010.01)
*F16H 61/47* (2010.01)
*F16H 61/472* (2010.01)

(52) U.S. Cl.
CPC ....... *F16H 61/423* (2013.01); *F16H 61/4008* (2013.01); *F16H 61/433* (2013.01); *F16H 61/47* (2013.01); *F16H 61/472* (2013.01)

(58) Field of Classification Search
CPC .................................................. F16H 61/4008
See application file for complete search history.

(56) References Cited

U.S. PATENT DOCUMENTS 8,683,794 B2 * 4/2014 Fukuda ............... F16H 61/4008
60/431

FOREIGN PATENT DOCUMENTS

EP 1 754 643 B1 2/2007

* cited by examiner

*Primary Examiner* — F Daniel Lopez
(74) *Attorney, Agent, or Firm* — Maginot, Moore & Beck LLP

(57) ABSTRACT

A hydrostatic propulsion drive for a vehicle is disclosed including an electronic control unit and a hydrostatic transmission having a hydraulic pump with an adjustable swept volume and a hydraulic motor with an adjustable swept volume, the hydraulic pump being arranged in a closed hydraulic circuit. The swept volumes of the hydraulic pump and the hydraulic motor are changeable in accordance with a correction factor which is stored in a characteristic diagram and is dependent on the rotational speed and the drive torque of the hydraulic motor, the operating pressure at the hydraulic motor being increased if the correction factor is used. Due to the increased operating pressure, flow-induced pressure drops are reduced by way of volumetric flows, and leakage flows via gaps between moving parts of the hydraulic pump and the hydraulic motor are kept large enough to avoid excessive friction and loss of efficiency.

10 Claims, 3 Drawing Sheets

HYDROSTATIC PROPULSION DRIVE FOR A VEHICLE

This application claims priority under 35 U.S.C. § 119 to application no. DE 10 2017 200 241.7, filed on Jan. 10, 2017 in Germany, the disclosure of which is incorporated herein by reference in its entirety.

TECHNICAL FIELD

The disclosure relates to a hydrostatic propulsion drive for a vehicle having a hydrostatic transmission which has a hydraulic pump with an adjustable swept volume and a hydraulic motor which likewise has an adjustable swept volume and is arranged with the hydraulic pump in a preferably closed hydraulic circuit, and having an electronic control unit.

BACKGROUND

For hydrostatic propulsion drives which are to provide exact transmission ratios and are to propel in an exactly speed-controlled manner, an electro-proportional (EP) pivot angle regulation is typically used both for the hydraulic pump and for the hydraulic motor. Typical applications are harvesting machines, combine harvesters, lift trucks, tractors with a power-split transmission, field sprayers, municipal vehicles and forestry machines. In part load operation, in which the operating pressure is low, the degree of efficiency of hydrostatic units (hydraulic pump or hydraulic motor) is typically poorer than under full load, since volumetric flow-induced pressure drops via lines and reduced cross sections in cast parts have a greater percentage effect at a low operating pressure, and since a low operating pressure leads to lower leakage flows via gaps between moving parts than a high operating pressure, and the friction increases as a result.

In EP 1 754 643 B1, the operating point of a diesel engine and a hydrostatic transmission is optimized during the running operation with regard to a low fuel consumption. In practice, this leads to the diesel engine rotational speed and the swept volumes of the hydrostatic machines frequently changing dynamically in a manner which is dependent on the load and the driver's request. This can be perceived as unpleasant by the driver.

SUMMARY

The disclosure is based on the object of designing a hydrostatic propulsion drive in such a way that it also has a satisfactory degree of efficiency in part load operation.

In order to improve the degree of efficiency of a hydrostatic propulsion drive of this type, it is provided according to the disclosure that the swept volume of the hydraulic pump and the swept volume of the hydraulic motor can be changed in accordance with a correction factor which is stored in a characteristic diagram and is dependent on the rotational speed and on the drive torque of the hydraulic motor, the operating pressure which prevails at the hydraulic motor being increased if the correction factor is used. As a result of the increased operating pressure, the leakage flows via gaps between moving parts of the hydraulic pump and the hydraulic motor are kept large enough, in order not to allow excessive friction and therefore losses of the degree of efficiency to occur. At the same time, the volumetric flow drops, with the result that the flow-induced pressure drops become lower.

The diesel engine rotational speed which is stipulated by the driver is not influenced. As a result, the driver does not notice that the operation of the hydrostatic transmission is being optimized.

The pivot angles of the hydrostatic units are manipulated only in part load operation, in such a way that the pressure rises, the volumetric flows and flow-induced pressure drops decrease, and the friction is reduced disproportionately on account of the leakage which rises proportionally with respect to the pressure. In this way, the degree of efficiency increases overall. No characteristic diagrams for the degree of efficiency are stored in the controller. The optimum swept volumes which correspond to optimum pivot angles in the case of axial piston units which are usually used as hydrostatic units of a hydrostatic transmission are defined in advance on the basis of measured data of the degree of efficiency, with the result that no optimization is necessary during running operation.

Advantageous refinements of a hydrostatic propulsion drive according to the disclosure can be found in embodiments.

In the hydrostatic propulsion drives, the transmission ratio of the hydrostatic transmission can usually be changed by way of a follow-up adjustment of the hydraulic pump and of the hydraulic motor. Here, first of all the swept volume of the hydraulic pump is adjusted up to a maximum swept volume and then the swept volume of the hydraulic motor is reduced, starting from a maximum step-down ratio, in which the hydraulic motor is set to a maximum swept volume and the hydraulic pump is set to a minimum swept volume. In the case of a hydrostatic transmission of this type with follow-up adjustment, the swept volumes are reduced in percent by way of the consideration of a correction value according to the disclosure in a manner which is dependent on the load state of the hydraulic motor, which load state is characterized by the drive torque and the output rotational speed. For example, the swept volume of the hydraulic motor and the swept volume of the hydraulic pump are reduced to 80% of the current values.

The characteristic diagram is advantageously stored in the electronic control unit.

The swept volume of the hydraulic motor and the swept volume of the hydraulic pump can be capable of being adjusted in accordance with the same characteristic diagram. It is also possible, however, to reduce the swept volume of the hydraulic pump via a second characteristic diagram in a different way, namely to a lesser extent than is the case in the hydraulic motor, the swept volume of which is reduced in accordance with a first characteristic diagram. In this way, the effect which is associated with the leakage which is increased at an increased pressure on the rotational speed of the hydraulic motor and therefore on the speed of the vehicle might be taken into consideration.

In order to keep the influence of the speed as low as possible even under the aspects of production deviations and the temperature dependence, it is preferred that a regulation of the rotational speed of the hydraulic motor is superimposed on the setting of the swept volumes in accordance with the at least one characteristic diagram. The speed drops as a result of the increase in the leakage. The increased leakage and the other influences on the speed can be compensated for by way of the superimposed speed regulator which acts on the speed by way of an increase in the pump volumetric flow. In the normal mode, in which the swept volumes of the hydraulic pump and the hydraulic motor remain without correction, the regulator acts on the hydraulic pump in a manner which increases the swept volume and on the hydraulic motor in a manner which reduces the swept volume. In the optimum mode, in which the swept volume of the hydraulic pump and the swept volume of the hydraulic motor can be changed in accordance with at least one correction value which is stored in a characteristic diagram, it is sufficient if the regulator acts only on the hydraulic pump because the pump angle which has already been reduced is increased again in this case. If the swept volume of the hydraulic motor is therefore reduced to, for example, 80% of the current value, the swept volume of the hydraulic pump is reduced by way of the influence of the speed regulator perhaps only to 84% of the current value.

A switchover can advantageously be carried out as desired between a normal mode, in which the swept volumes of the hydraulic pump and the hydraulic motor remain without correction, and an optimum mode, in which the swept volume of the hydraulic pump and the swept volume of the hydraulic motor can be changed in accordance with a correction value which is stored in a characteristic diagram. Correction values which are equal to 1 can then also be provided in the characteristic diagram. In the case of a correction value which is equal to 1, the optimum mode corresponds to the normal mode, with the result that the action of the speed regulator also corresponds to the normal mode.

In the optimum mode, in which the swept volume of the hydraulic pump and the swept volume of the hydraulic motor can be changed in accordance with at least one correction factor which is stored in a characteristic diagram, the swept volumes are preferably reduced slowly with the aid of a gradient limiting means. If the drive load rises suddenly, however, the pivot angles are moved back again to the follow-up adjustment via a rapid ramp. The gradient limiting means can therefore be different in the one adjustment direction than in the other adjustment direction.

In some circumstances, it is sufficient that a correction of the swept volumes of the hydrostatic units takes place only at a defined rotational speed of the drive motor which drives the hydraulic pump and is preferably a diesel engine. The characteristic diagram of the correction factor can also comprise, however, the dimension of input rotational speed of the hydraulic pump or rotational speed of the drive motor of the hydraulic pump.

The function is preferably used in hydrostatic transmissions, in which the swept volume of the hydraulic pump and the swept volume of the hydraulic motor can be adjusted in each case electro-proportionally.

However, the function can also operate with a hydraulic motor with an electro-proportionally adjustable swept volume and a load-deflected hydraulic pump. In this case, the volumetric flow is stipulated via the hydraulic motor, and the hydraulic pump is set to the angle which matches this on account of its load deflection capability.

BRIEF DESCRIPTION OF THE DRAWINGS

One exemplary embodiment of a hydrostatic propulsion drive according to the disclosure is shown in the drawings. The disclosure will now be described in greater detail using the figures of said drawings, in which.

DETAILED DESCRIPTION

Figure 1:
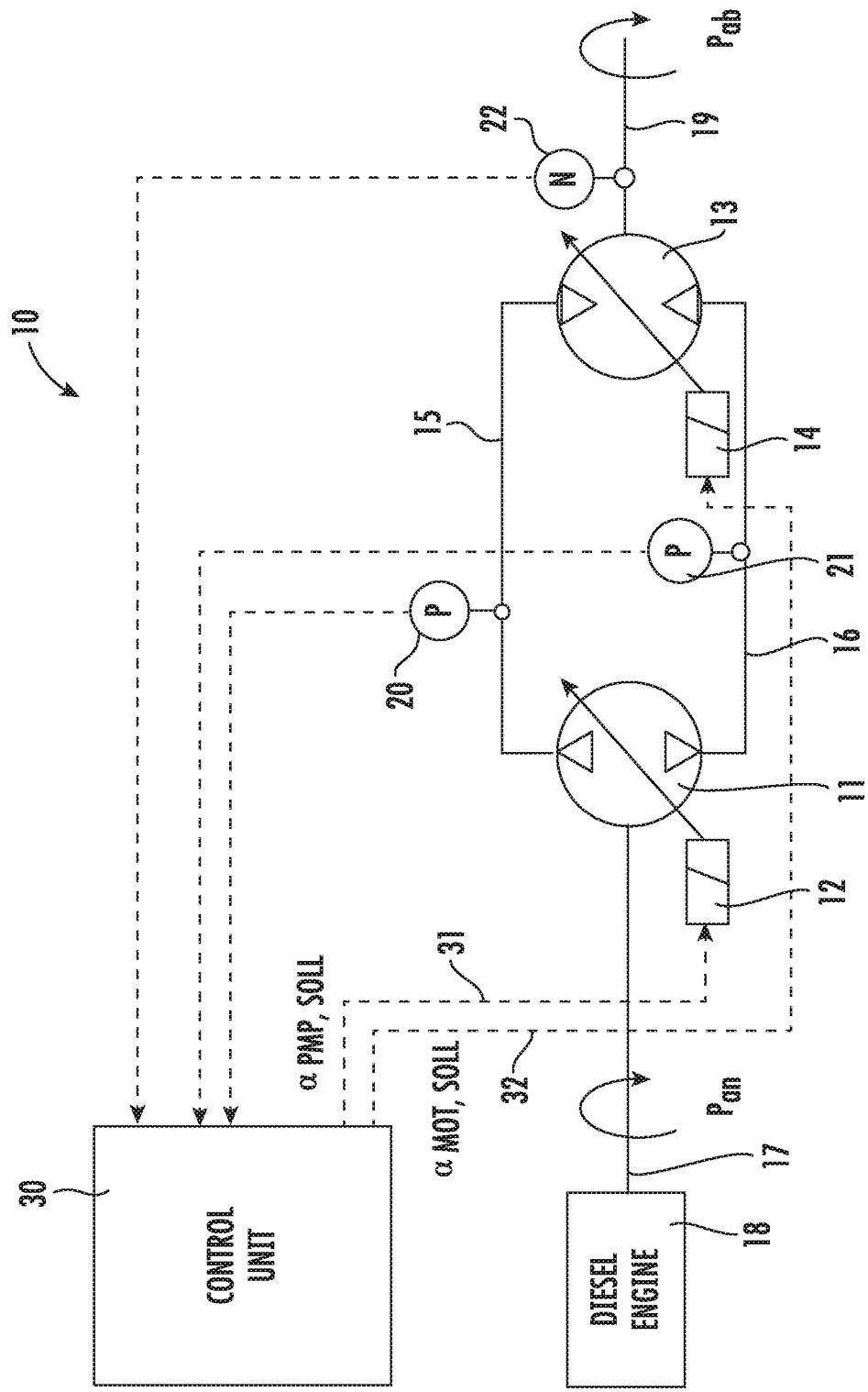
FIG. 1 shows a schematic of the exemplary embodiment.

The hydrostatic propulsion drive 10 which is shown comprises a hydraulic pump 11 with an adjustable swept volume and an adjusting apparatus 12, and a hydraulic motor 13 with a likewise adjustable swept volume and an adjusting apparatus 14. Here, swept volume is understood to mean the pressure medium quantity which is conveyed by the hydraulic pump during a single revolution of a drive shaft or which is sucked in by the hydraulic motor during a single revolution of its driveshaft. The hydraulic pump 11 and the hydraulic motor 13 are connected fluidically to one another in a closed hydraulic circuit via two operating lines 15 and 16. It is generally known that, in a constellation of this type, the hydraulic motor can also operate as a pump and the hydraulic pump can also operate as a motor in order to brake the vehicle. The hydraulic pump can be adjusted in two opposed directions from a neutral position, in which the swept volume is zero, with the result that the driving direction of the vehicle can be changed solely by way of adjustment of the hydraulic pump across zero. The hydraulic pump and the hydraulic motor are usually axial piston machines. The hydraulic pump 11 can be driven by a diesel engine 18 via a shaft 17. An output shaft 19 which is connected mechanically to two wheels of the vehicle in a way which is not shown in greater detail is driven by the hydraulic motor 13.

The pressure in the operating line 15 is detected by way of a pressure sensor 20. The pressure in the operating line 16 is detected by way of a pressure sensor 21. The rotational speed of the output shaft 19 is detected by way of a rotational speed sensor 22. The sensors 20 to 22 convert the detected variables into electric signals.

Furthermore, an electronic control unit 30 belongs to the hydrostatic propulsion drive 10, to which electronic control unit 30 the variables which are detected by the sensors 20 to 22 are fed as electric signals. The electronic control unit 30 is configured for controlling the hydrostatic transmission, the essential components of which are the hydraulic pump 11 and the hydraulic motor 13. For the purpose of said control, the control unit 30 is connected via an electric line 31 to the adjusting apparatus 12 of the hydraulic pump 11 and via an electric line 32 to the adjusting apparatus 14 of the hydraulic motor 13. The adjusting apparatus 12 of the hydraulic pump 11 preferably operates electro-proportionally and then has a regulating valve with a regulating piston which can be loaded with a force in the one direction by a first proportional electromagnet and in the opposite direction by a second proportional magnet, and to which regulating piston the position of an actuating piston of the adjusting apparatus is fed back as a spring force. The regulating piston always assumes a middle regulating position when the spring force which is produced by way of the position of the actuating piston is exactly as great as the magnetic force. In an adjusting apparatus of this type, there is an electro-proportional (EP) adjustment. However, the adjusting apparatus can also have, for example, two pressure regulating valves and an actuating piston which is adjoined by two actuating chambers which are loaded with different actuating pressures via the two pressure regulating valves. In a case of this type, the hydraulic pump is load-sensing, because its swept volume is dependent on the pump pressure and on the rotational speed at a given actuating pressure.

The adjusting apparatus of the hydraulic motor 13 is preferably likewise what is known as an EP adjustment, in which a pivot angle of the axial piston machine is set proportionally to the magnitude of an electric current, with which an electromagnet of a regulating valve is loaded, the pivot angle being fed back to the regulating valve, converted with the aid of a compression spring, as a force which acts counter to the force of the electromagnet. The hydraulic motor 13 can be adjusted only between a minimum and a maximum swept volume, but not across a swept volume of zero.

The electronic control unit 30 comprises a pump controller 33 and a motor controller 34, at the inputs of which an electric signal prevails which corresponds to a setpoint speed $v_{soll}$ of the vehicle and therefore to a setpoint rotational speed of the hydraulic motor 13. The pump controller 33 and the motor controller 34 output setpoint signals $\alpha_{Pmp,soll}$ and $\alpha_{Mot,soll}$ for the pivot angles of the hydraulic pump and of the hydraulic motor.

Furthermore, the control unit 30 comprises a speed regulator 35, to which a regulating deviation between the setpoint speed $v_{soll}$ and the actual speed $v_{ist}$ of the vehicle or between the setpoint rotational speed and the actual rotational speed of the hydraulic motor 13 is fed, and which speed regulator 35 influences both the signal of the pump controller and the signal of the motor controller by way of an actuating variable. Speed regulation is therefore superimposed on the pump controller 33 and the motor controller 34.

A characteristic diagram 36 is stored in the control unit 30, which characteristic diagram 36 comprises correction factors $K_{korr}$ for the pivot angles of the hydraulic pump 12 and of the hydraulic motor 13, which correction factors $K_{korr}$ are dependent on the rotational speed $n_{mot}$ of the hydraulic motor 13 and on the load which is standardized to a nominal magnitude and under which the hydraulic motor 13 operates. Here, the load which is standardized to a nominal magnitude results from the product of the pressure difference dp, which is determined with the aid of the two pressure sensors 20 and 21 and prevails across the hydraulic motor 13, and the pivot angle $\alpha_{Mot,soll}$ of the hydraulic motor. The respectively determined correction factor of less than/equal to 1 prevails at a first input of a switch 37 which also has a second input, at which a 1 prevails. An output of the switch 37 is connected to the input of a gradient limiter 38. Both the output signal of the motor controller 34 and the output signal of the pump controller 33 are multiplied by the value which prevails at an output of the gradient limiter 38.

Figure 3:
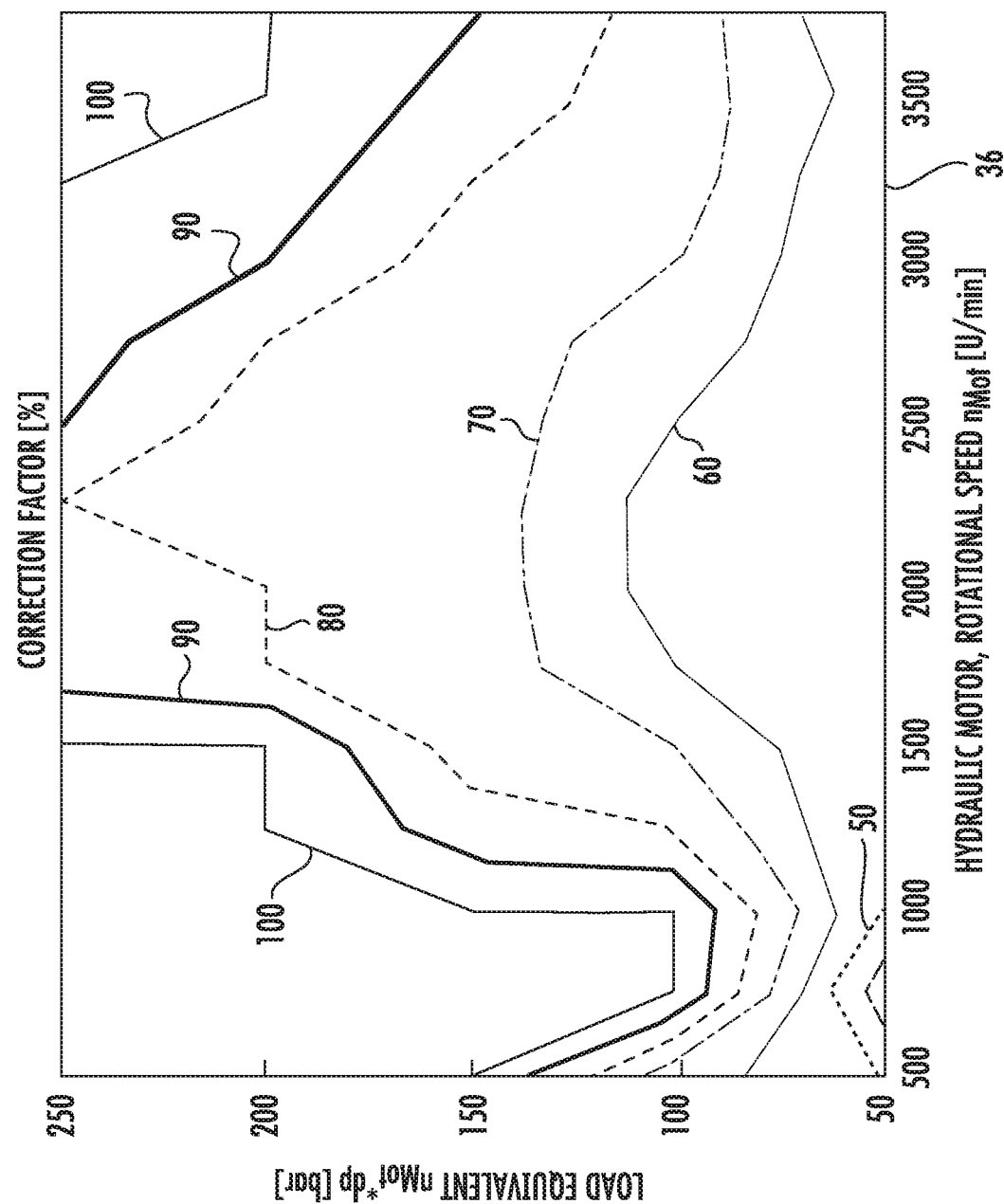
FIG. 3 shows a characteristic diagram for the correction factor.

FIG. 3 shows the characteristic diagram 36 with a plurality of isolines for the correction factor.

It is now to be assumed that the hydraulic motor 13 is to rotate at a defined rotational speed. The rotational speed of the hydraulic motor 13 results from the delivery quantity of the hydraulic pump 11 and the displacement of the hydraulic motor 13. In the normal mode, the switch 37 is switched in such a way that a 1 is output instead of a correction factor $K_{korr}$. In this way, the controller is not influenced. Normal mode means that the pivot angles are not to be reduced for the benefit of an improved degree of efficiency. This can be the case, for example, during road driving, decelerating and maneuvering. The condition for this can be different depending on the vehicle type. The electronic control unit 30 can then act, with consideration of the rotational speed of the hydraulic pump 12, in such a way that, at low rotational speeds, the hydraulic motor 13 is set to its maximum displacement and the desired rotational speed of the output shaft 19 is obtained by way of corresponding adjustment of the hydraulic pump. For rotational speeds higher than a rotational speed, at which the hydraulic pump is pivoted out completely, the hydraulic motor 13 is adjusted to displacements which are smaller than its maximum displacement.

Figure 2:
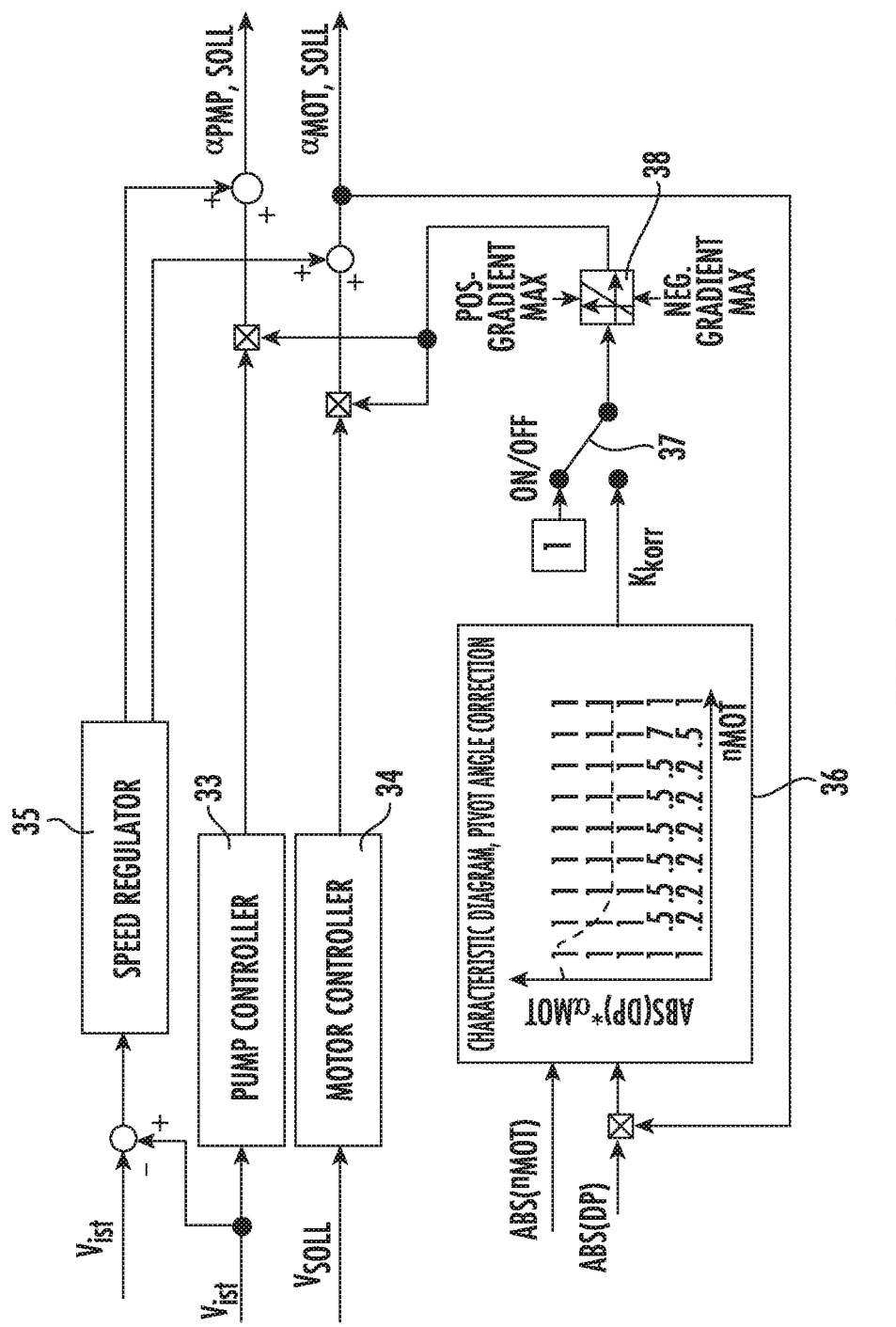
FIG. 2 shows a regulating diagram of the exemplary embodiment.

Under certain other conditions, it is better to operate in what is known as an optimum mode. The switch 37 is then moved into the switching position which is not shown in FIG. 2. In a combine harvester, for example, a switchover is carried out for fieldwork from the normal mode to the mode which is optimized in terms of the degree of efficiency. The values which are output by the pump controller 33 for the pivot angle of the hydraulic pump and by the motor controller 34 for the pivot angle of the hydraulic motor are then multiplied with a correction factor $K_{korr}$ which is read out from the characteristic diagram 36, slowly via ramps of the gradient limiter 38, in order to reduce the pivot angles of a hydraulic pump and a hydraulic motor by the same factor until the optimum ratio of leakage, pressure drop across the lines and ducts, and friction is set. The percentage proportion which is necessary for this is stored in the characteristic diagram in a manner which is dependent on the absolute value $Abs(n_{mot})$ of the hydraulic motor rotational speed and the hydraulic motor torque $(Abs(dp)*alpha\_rel)$ which is standardized to a nominal magnitude, and has been determined in advance in a computer-aided manner from characteristic diagrams of the degree of efficiency of the hydrostats. $Abs(dp)$ is the absolute pressure difference between the two values which are detected by the pressure sensors 20 and 21. alpha_rel is the pivot angle of the hydraulic motor specified in percent of the maximum pivot angle. Here, the correction factor becomes active via ramps of the gradient limiter 38, with the result that the pivot angles are reduced slowly. If, however, the output load rises suddenly, the pivot angles are moved back again to the follow-on adjustment via a steep ramp.

The speed drops as a result of the rise of the leakage. This is compensated for by way of the superimposed speed regulator which acts on the speed by way of an increase of the pump volumetric flow. In the normal mode, the regulator acts on the hydraulic pump so as to increase its swept volume and on the hydraulic motor so as to reduce its displacement. In the optimum mode, the regulator acts only on the pump, because the pump angle which has already been reduced is increased again in this case.

LIST OF REFERENCE NUMERALS

10 Hydrostatic propulsion drive
11 Hydraulic pump
12 Adjusting apparatus of 11
13 Hydraulic motor
14 Adjusting apparatus of 13
15 Working line
16 Working line
17 Shaft
18 Diesel engine
19 Output shaft
20 Pressure sensor
21 Pressure sensor
22 Rotational speed sensor
30 Control unit
31 Electric line
32 Electric line
33 Pump controller
34 Motor controller
35 Speed regulator
36 Characteristic diagram 37 Switch
38 Gradient limiter
$v_{Soll}$ Setpoint speed
$\alpha_{Pmp,soll}$ Setpoint pivot angle, hydraulic pump
$\alpha_{Mot,soll}$ Setpoint pivot angle of the hydraulic motor
$v_{ist}$ Actual speed
$n_{mot}$ Rotational speed of the hydraulic motor
$M_{Mot}$ Drive torque of the hydraulic motor
$K_{korr}$ Correction factor
dp Pressure difference

What is claimed is:

1. A hydrostatic propulsion drive for a vehicle, the hydrostatic propulsion drive comprising:
a hydrostatic transmission having a hydraulic pump with an adjustable swept volume and a hydraulic motor with an adjustable swept volume, the hydraulic pump being arranged in a hydraulic circuit; and
an electronic control unit configured to increase an operating pressure that prevails at the hydraulic motor by changing the swept volume of the hydraulic pump and the swept volume of the hydraulic motor in accordance with at least one correction factor, the at least one correction factor being stored in at least one characteristic diagram and being dependent on both a rotational speed of the hydraulic motor and a drive torque of the hydraulic motor.

2. The hydrostatic propulsion drive according to claim 1, the electronic control unit further configured to:
change a transmission ratio of the hydrostatic transmission by performing a follow-up adjustment of the hydraulic pump and the hydraulic motor, the swept volume of the hydraulic pump being first adjusted up to a maximum swept volume and then the swept volume of the hydraulic motor being decreased, starting from a maximum step-down ratio, in which the hydraulic motor is set to a maximum swept volume and the hydraulic pump is set to a minimum swept volume.

3. The hydrostatic propulsion drive according to claim 1, wherein the electronic control unit is configured to store the at least one characteristic diagram.

4. The hydrostatic propulsion drive according to claim 1, the electronic control unit further configured to:
superimpose a regulation of the rotational speed of the hydraulic motor on the changing of the swept volume of the hydraulic pump and the swept volume of the hydraulic motor in accordance with the at least one characteristic diagram.

5. The hydrostatic propulsion drive according to claim 1, the electronic control unit further configured to:
carry out a switchover between (i) a normal mode, in which the swept volume of the hydraulic pump and the swept volume of the hydraulic motor remain without correction, and (ii) an optimum mode, in which the swept volume of the hydraulic pump and the swept volume of the hydraulic motor are changed in accordance with the at least one correction factor which is stored in the at least one characteristic diagram.

6. The hydrostatic propulsion drive according to claim 1, the electronic control unit further configured to:
reduce the swept volume of the hydraulic pump and the swept volume of the hydraulic motor using a gradient limiter in an optimum mode, in which the swept volume of the hydraulic pump and the swept volume of the hydraulic motor are changed in accordance with the at least one correction factor which is stored in the at least one characteristic diagram.

7. The hydrostatic propulsion drive according to claim 1, wherein the at least one characteristic diagram of the at least one correction factor has a rotational speed of the hydraulic motor as a dimension of input.

8. The hydrostatic propulsion drive according to claim 1, the electronic control unit further configured to:
adjust the swept volume of the hydraulic pump and the swept volume of the hydraulic motor in each case electro-proportionally.

9. The hydrostatic propulsion drive according to claim 1, the electronic control unit further configured to:
adjust the swept volume of the hydraulic motor electro-proportionally.

10. The hydrostatic propulsion drive according to claim 1, wherein the hydraulic circuit is a closed hydraulic circuit.

* * * * *